United States Patent [19]
Mestanza et al.

[11] Patent Number: 6,022,941
[45] Date of Patent: Feb. 8, 2000

[54] BRANCHED POLYCARBONATE PRODUCED BY REACTIVE EXTRUSION

[75] Inventors: Raphael Mestanza, Kuntzig, France; Theodorus L. Hoeks, Bergen op Zoom; Johannes J. De Bont, Wouw, both of Netherlands

[73] Assignee: General Electric Company, Schenectady, N.Y.

[21] Appl. No.: 09/053,348

[22] Filed: Apr. 1, 1998

[51] Int. Cl.[7] ................................................. C08G 64/00
[52] U.S. Cl. ............................................. 528/196; 528/198
[58] Field of Search ..................................... 528/196, 198

[56] References Cited

U.S. PATENT DOCUMENTS

| | | | |
|---|---|---|---|
| 2,999,835 | 9/1961 | Goldberg | 528/40 |
| 3,027,814 | 4/1962 | Schnellmann | 528/42 |
| 3,028,365 | 4/1962 | Schnell et al. | 528/196 |
| 3,030,331 | 4/1962 | Goldberg | 528/196 |
| 3,153,008 | 10/1964 | Fox | 528/196 |
| 3,169,121 | 2/1965 | Goldberg | 528/196 |
| 3,275,601 | 9/1966 | Schnell et al. | 528/196 |
| 3,334,154 | 8/1967 | Kim | 528/196 |
| 3,489,715 | 1/1970 | Calkins | 528/196 |
| 3,839,247 | 10/1974 | Bialous et al. | 528/196 |
| 3,915,926 | 10/1975 | Wambach | 528/196 |
| 4,138,379 | 2/1979 | Scott et al. | 528/196 |
| 4,188,314 | 2/1980 | Fox et al. | 528/196 |
| 4,286,083 | 8/1981 | Kochanowski | 528/196 |
| 4,474,999 | 10/1984 | Mark et al. | 568/720 |
| 4,487,896 | 12/1984 | Mark et al. | 525/439 |
| 4,621,132 | 11/1986 | Quinn et al. | 528/194 |

FOREIGN PATENT DOCUMENTS

| | | |
|---|---|---|
| 0 708 130 | 4/1996 | European Pat. Off. . |
| WO 94 19390 | 9/1994 | WIPO . |

OTHER PUBLICATIONS

International Search Report on PCT/US 99/06434.

*Primary Examiner*—Terressa Mosley-Boykin

[57] ABSTRACT

Polycarbonate can be branched by reactive extrusion using free radical chemistry. This technology combines the effect of free radical initiator and branching agent on polycarbonate during processing. Melt Strength of polycarbonate can be increased by addition of a triacrylate as branching agent and peroxide as radical initiator.

10 Claims, No Drawings

BRANCHED POLYCARBONATE PRODUCED BY REACTIVE EXTRUSION

BACKGROUND OF THE INVENTION

1. Field of the Invention

The invention relates to polycarbonate resins and their use in molding articles.

2. Brief Description of the Related Art

Aromatic polycarbonate resins are a well known class of synthetic polymeric resins, generally prepared by the reaction of a polyhydric phenol with a carbonate precursor; see for example U.S. Pat. No. 3,028,365. Although such resins have been found to be thermoplastically moldable under a broad range of molding conditions, only select polycarbonate resin compositions are useful for blow-molding. This is due to the unique requirements of a thermoplastic resin for blow-molding operations; see for example the requirements for the branched polycarbonate resins described in U.S. Pat. Nos. 4,286,083 and 4,621,132. The branched polycarbonate resins differ from most thermoplastic polymers used for molding in their melt rheology behavior. Most thermoplastic polymers exhibit non-Newtonian flow characteristics over essentially all melt processing conditions. However, in contrast to most thermoplastic polymers, certain branched polycarbonates prepared from dihydric phenols exhibit Newtonian flow at normal processing temperatures and shear rates below 300 reciprocal seconds.

Newtonian flow is defined as the type of flow occurring in a liquid system where the rate of shear is directly proportional to the shearing force.

Two other characteristics of molten thermoplastic polymers considered to be significant for molding operations are melt elasticity and melt strength. Melt elasticity is the recovery of the elastic energy stored within the melt from distortion or orientation of the molecules by shearing stresses. Melt strength may be simply described as the tenacity of a molten strand and indicates the ability of the melt to support a stress. Both of these characteristics are important in extrusion blow molding, particularly in fabrication by extrusion blow molding of relatively large articles. Non-Newtonian flow characteristics tend to impart melt elasticity and melt strength to polymers thus allowing their use in blow molding fabrication.

In the conventional blow-molding operation, a tube of the heat-softened polycarbonate resin may be extruded vertically into a mold. The extrudate is then pressed unto the mold surfaces with a pressurized gas flow (usually air or inert gas), shaping the heat-softened resin.

In practice, the desired physical characteristics of a blow-moldable polycarbonate resin can be achieved by either high molecular weight or branched polycarbonate. For example polycarbonate resins can be branched by reaction with tetraphenolic compounds; see for example the description in U.S. Pat. No. 4,474,999 (Mark et al.). Due to better performance the latter is preferred. Currently, a branched resin is synthesized. The proper melt strength and viscosity is obtained by controlling the molecular weight and the branching level. It would be highly advantageous if the same rheological behavior could be achieved by reacting a linear polycarbonate, during the compounding process in such a say that a polymer is obtained with same rheological properties as the currently available branched resin prepared by synthesis. This latter synthesis is time consuming and expensive. Any "off-specification" material produced is wasted. These disadvantages are not associated with the production of linear polycarbonate resins.

By the method of the present invention, we were able to produce a polycarbonate resin possessing a certain degree of branching and molecular weight, via reactive extrusion. This was achieved by melt extruding a linear polycarbonate resin with a specific branching agent and an appropriate catalyst system.

SUMMARY OF THE INVENTION

The invention comprises a process for branching a thermoplastic, linear, polycarbonate resin, which comprises;

providing a linear polycarbonate resin;

homogeneously mixing with the linear polycarbonate resin, a branching proportion of a polyunsaturated polycarbonate branching agent; and heating the mixture in the presence of a free-radical initiator to a temperature range sufficient to effect branching of the linear polycarbonate resin.

Advantageously the branching agent has a structure within the scope of the formula (I) infra.

Advantageously the branching reaction is effected by melt extrusion of the mixture.

The branched polycarbonate resins produced by the process of the invention are useful blow-moldable resins characterized-in-part by an enhanced melt strength and melt elasticity. Other advantageous physical properties will be described below. The branched polycarbonate products of the invention are useful in applications such as profile extrusion (for example of wire and cable insulation, extruded bars, pipes, fiber optic buffer tubes, and sheets); blowmolding (for example of containers and cans, gas tanks, automotive exterior applications such as bumpers, aerodams, spoilers and ground effects packages); and thermoforming (for example of automotive exterior applications and food packaging).

DETAILED DESCRIPTION OF THE PREFERRED EMBODIMENTS OF THE INVENTION

The linear polycarbonates advantageously branched according to the process of the invention are well known synthetic polymers as are the methods of their preparation.

Polycarbonate resins (linear) and their method of preparation by interfacial polymerization are well known; see for example the details provided in the U.S. Pat. Nos. 3,028,365; 3,334,154; 3,275,601; 3,915,926; 3,030,331; 3,169,121; 3,027,814; and 4,188,314, all of which are incorporated herein by reference thereto.

Linear polycarbonate resins used in the process of the invention are resins containing repeating or recurring polycarbonate units of the formula:

(II)

wherein D is a divalent aromatic radical of a dihydric phenol employed in the polymerization reaction, which comprises the reaction of the dihydric phenol with a carbonate precursor. The reaction is well known and is described for example in the U.S. Pat. Nos. 3,028,365; 3,334,154; 3,275,601; 3,915,926; 3,030,331; 3,169,121; and 3,027,814.

Although the reaction conditions of the preparative processes may vary, the interfacial polymerization processes typically involve dissolving or dispersing the phenol reactant in a suitable water immiscible solvent medium and contacting the reactants with the carbonate precursor, such as phosgene, in the presence of a suitable catalyst and an aqueous caustic solution under controlled pH conditions. The most commonly used water immiscible solvents include methylene chloride, 1,1-dichloroethane, chlorobenzene, toluene, and the like.

The catalyst employed accelerates the rate of polymerization of the dihydric phenol reactant with the carbonate precursor. Representative catalysts include but are not limited to tertiary amines such as triethylamine, quaternary phosphonium compounds, quaternary ammonium compounds, and the like. The preferred process for preparing polycarbonate resins comprises a phosgenation reaction. The temperature at which the phosgenation reaction proceeds may vary from below 0° C., to above 100° C. The phosgenation reaction preferably proceeds at temperatures of from room temperatures (25° C.) to 50° C. Since the reaction is exothermic, the rate of phosgene addition and solvent reflux may be used to control the reaction temperature. The amount of phosgene required will generally depend upon the amount of the dihydric phenol present.

As mentioned above, the symbol "D" as used in the formula (II) above designates the divalent aromatic radical of a dihydric phenol used in the preparation of a linear polycarbonate.

Typical of some of the dihydric phenols that are advantageously employed are bis-phenols such as bis(4-hydroxyphenyl)methane, 2,2'-bis-(4-hydroxy-3-methylphenyl)propane, 4,4'-bis(4-hydroxy-phenyl)-heptane, 2,2'-bis(4-hydroxy-3,5-dichlorophenyl)propane, 2,2'-bis(4-hydroxy-3,5-dibromo-phenyl)propane; dihydric phenol ethers such as bis(4-hydroxphenyl)ether, bis(3,5-dichloro-4-hydroxyphenyl)ether; dihydroxydiphenols such as 3,3'-dichloro-4,4'-dihydorxybiphenyl; dihydroxyaryl sulfones such as bis(4-hydroxyphenyl) sulfone, bis(3,5-dimethyl-4-hydroxyphenyl)sulfone; dihydroxybenzenes, such as resorcinol and hydroquinone; halo- and alkyl-substituted dihydroxy benzenes such as 1,4-dihydroxy-2,5-dichlorobenzene, 1,4-dihydroxy-3-methylbenzene; and dihydroxy diphenyl sulfides and sulfoxides such as bis(4-hydroxyphenyl)-sulfide and bis(4-hydroxyphenyl) sulfoxide. A variety of additional dihydric phenols are also available and are disclosed in U.S. Pat. Nos. 2,999,835; 3,028,365 and 3,153,008, all of which are incorporated herein by reference. It is, of course, possible to employ two or more different dihydric phenols or a combination of a dihydric phenol with glycol.

Preferred dihydric phenols of Formula are the 4,4'-bisphenols.

The term "polycarbonate" as used herein is also inclusive of copolyester-polycarbonates, i.e.; resins which contain in addition to recurring polycarbonate chain units of Formula (II) given above, wherein D represents the divalent aromatic radical of the dihydric phenol repeating or recurring carboxylate units, for example of formula:

(III)

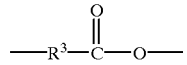

wherein $R^3$ is a divalent hydrocarbylene group such as an alkylene, alkylidene, or cycloalkylene group; an alkylene, alkylidene or cycloalkylene group containing ethylenic unsaturation; an aromatic group such as phenylene, biphenylene, and the like; two or more aromatic groups connected through non-aromatic linkages such as alkylene or alkylidene groups; and a divalent aralkyl radical such as tolylene, xylylene, and the like, The copolyester-carbonate resins used in the method of the invention include some which are generally well known. In general, they are prepared as described above for the preparation of polycarbonate, but by the added presence of a difunctional carboxylic acid (ester precursor) in the water immiscible solvent; see for example U.S. Pat. Nos. 3,169,121 and 4,487,896 incorporated herein by reference thereto.

In general, any difunctional carboxylic acid (dicarboxylic acid) conventionally used in the preparation of linear polyesters may be utilized in the preparation of the linear copolyester-carbonate resins branched by the process of the instant invention. Generally, the difunctional carboxylic acids which may be utilized include the aliphatic carboxylic acids, the aromatic carboxylic acids, and the aliphatic-aromatic carboxylic acids. These acids are well known and are disclosed for example in U.S. Pat. No. 3,169,121, which is hereby incorporated herein by reference. Representative of such difunctional carboxylic acids are difunctional carboxylic acids of the formula:

(IV)

wherein $R^3$ has the meaning previously ascribed to it.

Preferred difunctional carboxylic acids employed are the aromatic dicarboxylic acids. Particularly useful aromatic dicarboxylic acids are those represented by the general formula:

(V)

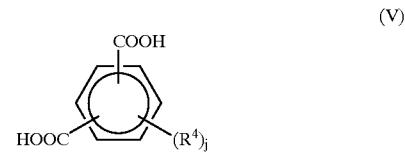

wherein j is a positive whole integer having a value of from 0 to 4 inclusive; and each $R^4$ is independently selected from the group consisting of alkyl radicals, preferably lower alkyl radicals (containing from 1 to about 5 carbon atoms).

Mixtures of these difunctional carboxylic acids may be employed as well as single acids. Therefore, where the term difunctional carboxylic acid is used herein it is to be understood that this term includes mixtures of two or more different difunctional carboxylic acids as well as individual carboxylic acids.

Most preferred as aromatic dicarboxylic acids are isophthalic acid, terephthalic acid, and mixtures thereof. A particularly useful difunctional carboxylic acid comprises a mixture of isophthalic acid and terephthalic acid wherein the weight ratio of terephthalic acid to isophthalic acid is in the range of from about 10:1 to about 0.2:9.8.

Rather than utilizing the difunctional carboxylic acid per se, it is possible, and sometimes even preferred, to employ the reactive derivatives of said acid. Illustrative of these reactive derivaties are the acid halides. The preferred acid halides are the acid dichlorides and the acid dibromides. Thus, for example, instead of using isophthalic acid, terephthalic acid or mixtures thereof, it is possible to employ isophthaloyl dichloride, terephthaloyl dichloride, and mixtures thereof. It should be understood then that the term "difunctional carboxylic acid" as used herein, includes the reactive derivatives.

The proportions of reactants employed to prepare the linear copolyester-carbonate resins will vary in accordance with the proposed use of the product resin. Those skilled in the art are aware of useful proportions, as described in the U.S. patents referred to above. In general, the amount of the ester bonds may be from about 5 to about 90 mole percent, preferably from about 35 to about 80 mole percent, relative to the carbonate bonds. For example, 5 moles of bisphenol-A reacting completely with 4 moles of isophthaloyl dichloride and 1 mole of phosgene would give a copolyester-carbonate of 80 mole percent ester bonds.

In the conventional polymerization methods of preparing polycarbonates, a molecular weight regulator (a chain stopper) is generally added to the reaction mixture prior to or during the contacting with a carbonate precursor. Useful molecular weight regulators include, but are not limited to, monohydricphenols such as phenol, chroman-I, paratertiarybutyl-phenol, p-cumylphenol and the like. Techniques for the control of molecular weight are well known in the art and used for controlling the molecular weight of the polycarbonate branching agent resins used in the present invention.

In accordance with the process of the present invention, a branching agent as described above is homogeneously admixed to the linear polycarbonate resin to be branched. Admixture may be carried out with the aid of conventional resin mixing apparatus, including but not limited to conventional resin extruders equipped to mix two different resin materials, dry mixers and the like. The solid resins may be pre-mixed before introduction into the extruder.

A branching proportion of the branching agent will depend upon the density of branches desired and the number of branch sites available. In general, from about 0.1 to 25 percent by weight of the linear polycarbonate, will comprise a branching proportion of branching agent resin.

Branching agents useful to branch linear polycarbonates are generally well known in the art. Representative of such agents are the polyunsaturated compounds classed as polyacrylates and polymethacrylates.

Representative of polyacrylate and polymethacrylate compounds useful as branching agents for branching linear polycarbonate resins are those of the structural formula:

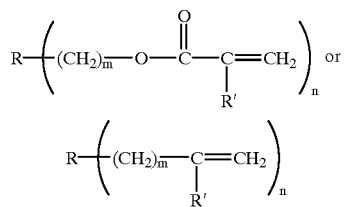

wherein R represents an organic moiety, R' represents hydrogen or methyl, m is an integer of from 0 to 2 and n is an integer of from 2 to 4.

Illustrative of the compounds of the formula (II) are:
Divinylbenzene (DVB),
Triallylisocyanurate (TAIC)

Illustrative of the compounds of the formula (I) are:
Trimethylolpropane trimethyacrylate (TMPTMA) of formula:

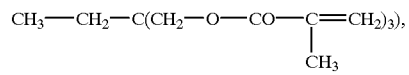

Ethoxylated Bisphenol A diacrylate (BPADA of formula

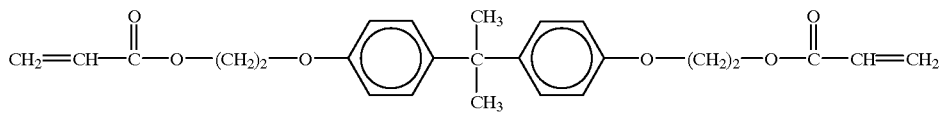

Trimethylolpropane triacrylate (TMPTA of formula

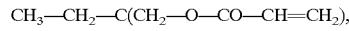

Pentaerythritol triacrylate (PETA of formula

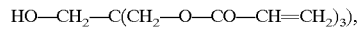

and
Pentaerythritol tetracrylate (PETTA of formula

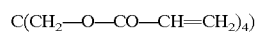

The thermoplastic molding resin compositions of the instant invention may also be admixed with various commonly known and used additives such as, for example, antioxidants; antistatic agents; inert filler such as glass, talc, mica, and clay; ultraviolet radiation absorbers such as the benzo-phenones, benzotriazoles, and the like; hydrolytic stabilizers such as the epoxides disclosed in U.S. Pat. Nos. 3,489,716, 4,138,379 and 3,839,247, all of which are incorporated herein by reference; color stabilizers such as the organophosphites; thermal stabilizers such as phosphite; flame retardants; and mold release agents.

By the method of the invention, the mixture of linear polycarbonate resin and branching agent with or without other molding additives are heated to a temperature sufficient to bring about the desired branching reaction. Advantageously, heating is within a temperature range of from about 100° C. to about 350° C.

Heating is in the presence of a free-radical initiator such as a peroxide. Preferred organic peroxides are described by the general formulas R10—O—O—R11 or R10—O—O—R11—O—O—R12 wherein R10, R11 and R12are each independently alkyl, aryl, substituted alkyl or substituted aryl. More preferred organic peroxides include 2,5-dimethyl 2,5-(tert-butylperoxy) hexane or DHBP, $t_{1/2}$ í6 min. at 156° C. Xí—$CH_2CH_2$—, and 2,5-dimethyl 2,5-(tert-butylperoxy) hexyne or DYBP, $T_{1/2}$ í6 min. at 164° C. Xí—C°C.— having the central structure:

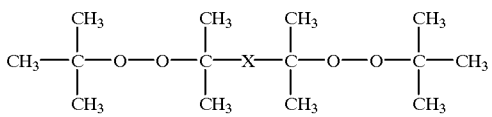

A free-radical initiating proportion is present in the mixture to be heated. The proportion is generally in the range of from about 0.1 to 5 weight percent of the polycarbonate resin.

Although we are not to be bound by any theory of operation, the assumed mechanism of branching, based on polyolefins technology, is shown in the schematic formula given below. The first step is the thermal decomposition of a radical initiator which attacks the methyl groups of the BPA units in order to create polycarbonate macroradicals. The macroradicals can be recombined by a radical branching agent (compound containing at least 2 double bonds) to generate branched structure. The key of the process will be the lifetime of the radicals and the sensitivity of the polycarbonate backbone versus radicals.

The reaction product obtained upon reaction of the multifunctional branching agent is a new branching agent which may be melt blended with a polycarbonate resin as described above in a ratio of from about 1 to about 3 to obtain a branched polycarbonate resin.

The production of the compositions of the invention is done by any of the blending operations known for the blending of thermoplastics, such as blending in a kneading machine such as a Banbury mixer. Blending can be done continuously or batchwise.

Upon melt extrusion, branching and cross-linking occurs in the polycarbonate resin melt.

The minimum temperature of the melt extrusion reaction is sufficiently high to create a melt of the reactants. Such a temperature is achieved in an extruder or a molding machine such as an injection or compression molder normally employed for extruding or molding polycarbonate.

The following examples and preparations describe the manner and process of making and using the invention and set forth the best mode contemplated by the inventor of carrying out the invention but are not to be construed as limiting the invention. Where reported, the following tests were carried out:

Dynamic Rheometry

Branching level is determined by curves reflecting the following relationships:

$$\eta^* = f(\omega),\ G' = f(\omega),\ G'' = f(\omega)\ \text{and}\ \tan\delta = G'/G'' = f(\omega)$$

at 230° C. and $0.1 < \omega < 500$ rad/s as measured by a dynamic plate-plate rheometer such as model RDS 7000 (RHEOMETRICS).

Molecular Weight ($M_w$)

The weight average molecular weight ($M_w$) may be determined by gel permeation chromatography (GPC) in chloroform relative to polystyrene standards using a UV detector at 254 nm.

EXAMPLE 1

A quantity of a linear polycarbonate resin selected from one of
A. PC135 linear, Mw 35000 g/mol (predominantly) or
B. PC605 linear, soft segment co-polycarbonate containing 10 mol. % dodecyldiacid ($C_{10}$ aliphatic sequences, more sensitive to radicals); was provided.
For control purposes, a third resin (resin C•PC195 branched) was provided.
Resin C•PC195 branched, used as reference is manufactured by General Electric Company, Pittsfield, Mass. This particular resin was directly prepared by synthesis and contains 0.3 percent by mole of tri-(4-hydroxyphenyl) ethane as branching agent. The material was compounded on a melt extruder (a corotating twin screw extruder with a barrel length of 950 mm, and a screw length of 951 mm) under a vacuum of 0.5 atmospheres at 300 RPM and at a temperature profile of 200–300° C.
Resin A was compounded under the same compounding conditions as described for Resin C but with 0.2 percent by weight of 2-5-dimethyl 2,5-(tertiobutylperoxy) hexane (free radical initiator) and 2 percent by weight of Pentaerythritol triacrylate (branching agent). The mixture was dry blended on a Henschel Blender and then melt extruded at a set temperature of 230C.
Resin B was compounded under the same compounding conditions as described for Resin C but with 0.1 percent by weight of 2.5-dimethyl 2,5-(tertiobutylperoxy) hexane (free radical initiator) and 1 percent by weight of Pentaerythritol triacrylate (branching agent). The amount of reactive species needed are lower than in resin A because the higher sensitivity towards radical of the $C_{10}$ sequences of the copolymer. Introduction of Higher amounts results in partial cross-linking making difficult additional processing like blow molding, extrusion, injection molding . . .

Branched polycarbonate resins were obtained with the physical properties reported in the table below.

| | Plate-plate results at 230C | | | | |
|---|---|---|---|---|---|
| | PC135 Linear | PC605 linear soft segment | PC195 Branched reference | Resin A Modified PC135 | Resin B Modified PC605 |
| Tan δ at 0.1 rad/s (1) | 25 | 100 | 6.1 | 10 | 9.1 |
| Tan δ at 500 rad/s (2) | 0.65 | 1.1 | 0.74 | 0.7 | 1.0 |

(1) Tan δ at 0.1 rad/s is directly proportional to Melt Strength or the level of branching; lower is the value, higher is the level of branching.
(2) Tan δ at 500 rad/s is directly proportional to Mw; lower is the value, higher is the Mw.

What is claimed:
1. A process for branching a thermoplastic, linear, polycarbonate resin, which comprises;
   providing a linear polycarbonate resin;
   homogeneously mixing with the linear polycarbonate resin, a branching proportion of a polyunsaturated polycarbonate branching agent; and
   heating the mixture in the presence of a free-radical initiator to a temperature range sufficient to effect branching of the linear polycarbonate resin, thereby producing a branched resin.
2. The process of claim 1 wherein the linear polycarbonate resin has recurring chain units of the formula:

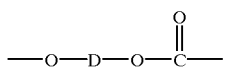
(II)

wherein D is a divalent aromatic radical of a dihydric phenol employed in the polymerization reaction, which comprises the reaction of the dihydric phenol with a carbonate precursor.

3. The process of claim 2 wherein the linear polycarbonate resin has an tan δ value at 0.1 rad/s and 230° C. of 25–100.

4. The process of claim 1 wherein the branching agent is a polyacrylate or polymethacrylate.

5. The process of claim 4 wherein the branching resin is of the formula:

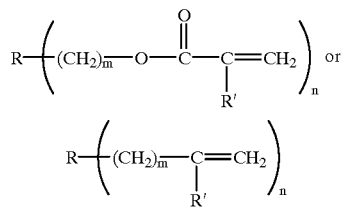

wherein R represents an organic moiety, R' represents hydrogen or methyl, m is an integer of from 0 to 2 and n is an integer of from 2 to 4.

6. The process of claim 1 wherein the reaction is at a temperature range of from 100° C. to 350° C.

7. The process of claim 1 wherein the reaction is carried out under melt extrusion conditions.

8. The product of the process of claim 1.

9. The process of claim 3, wherein the branched resin has an tan δ value at 0.1 rad/s and 230° C. of less than 25.

10. A process for producing a thermoplastic, linear polyarbonate resin, which process comprises:

(a) producing a linear polyarbonate resin by interfacial polymerization, (b) mixing the linear polyarbonate resin together with a polyunsaturated polycarbonate branching agent and a free-radical initiator, thereby forming a mixture, (c) melt extruding the mixture under conditions sufficient to heat the mixture to a sufficient temperature range to effect branching of the linear polyarbonate resin, thereby producing a branched resin.

* * * * *